J. Mays,
Drag Saw.
N° 19,145.  Patented Jan. 19, 1858.
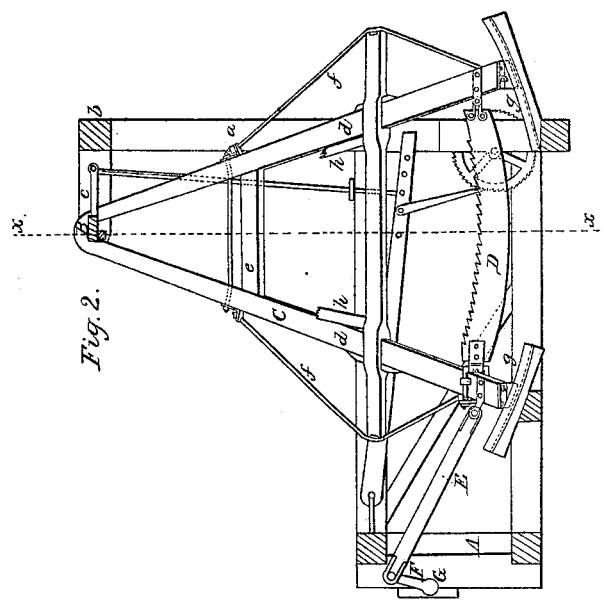
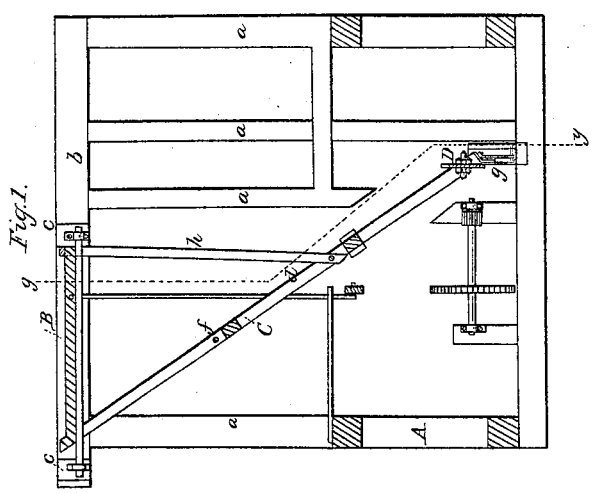

UNITED STATES PATENT OFFICE.

JOHN MAYS, OF YAZOO CITY, MISSISSIPPI.

SAWING-MACHINE.

Specification of Letters Patent No. 19,145, dated January 19, 1858.

*To all whom it may concern:*

Be it known that I, JOHN MAYS, of Yazoo City, in the county of Yazoo and State of Mississippi, have invented a new and Improved Sawing-Machine for Sawing Logs; and I do hereby declare that the following is a full, clear, and exact description of the same, reference being had to the annexed drawings, making a part of this specification, in which—

Figure 1 is a transverse vertical section of my improvement; (*x*), (*x*), Fig. 2 showing the plane of section. Fig. 2 is a longitudinal section of ditto; (*y*), (*y*), Fig. 1 indicating the line of section.

Similar letters of reference indicate corresponding parts in the two figures.

To enable those skilled in the art to fully understand and construct my invention, I will proceed to describe it.

A represents a framing which may be constructed of timber of proper size to give the necessary strength and support properly the working parts. At one end of the framing A uprights (*a*) are secured, the uprights having a cross piece (*b*) on their upper ends. To this cross-piece two arms (*c*) (*c*) are attached, the arms being parallel with each other and projecting at right-angles from the cross-piece (*b*).

B represents a shaft, the journals of which are fitted in the ends of the arms (*c*) (*c*) and C is a frame one end of which is attached to the shaft B. This frame C is formed of two bars (*d*) (*d*) the upper ends of which are quite near together and are attached to one end of the shaft B, the bars (*d*) (*d*) gradually spreading out or receding from each other as shown clearly in Fig. 2. The bars (*d*) (*d*) are connected by cross-pieces (*e*) and metal braces or rods (*f*) may be employed to strengthen the frame. Between the two ends of the two bars (*d*) (*d*) the saw D is. The saw D is of curved or segment form, and should be a portion of a circle of which the axis of the shaft B is the center. The form or shape of the saw is plainly shown in Fig. 2. The ends of the two bars (*d*) (*d*) rest in curved guides (*g*) (*g*), and the supports (*h*) (*h*) are attached to the bars (*d*) (*d*), one to each, the upper ends of these supports being attached to the shaft B. The supports (*h*) (*h*) prevent the bars (*d*) (*d*) from bearing in the guides (*g*) (*g*) with their whole weight.

To one of the bars (*d*) a pitman E is attached. This pitman is attached to a crank F at one end of a driving shaft G.

The shaft G may be connected with any of the ordinary horse powers, and a reciprocating motion is given the saw, D, by the crank F, and pitman E. The saw D it will be seen works near the surface of the ground and no pit or excavation will be required as in ordinary saw mills.

The saw may work either in a horizontal or in a vertical position. For sawing logs into boards or planks the saw will of course work up and down with a curve-lined motion, or in the arc of a circle, the log being placed on the usual carriage. But if logs are merely to be sawed for cord or fire wood the saw may work horizontally, the logs resting upon the saw and being fed to the saw by their own weight.

It will be observed that the frame C is arranged diagonally to a vertical plane, so that when the saw swings horizontally it serves for cutting the logs into blocks or for fire wood; and when it swings vertically it serves to cut the logs into boards and planks, no alteration in the mill being required for both of these operations, except to change or raise the frame from a horizontal to a vertical position.

Having thus described my invention what I claim and desire to secure by Letters Patent is—

The arrangement of the angular frame C diagonally to a vertical plane, so that when the saw swings horizontally it shall serve to cut the logs into blocks or firewood; and when it swings vertically it shall serve to cut the logs into boards or planks, without any other alteration of the mechanism of the mill but a change of the saw, and frame from a horizontal to a vertical position, all substantially as herein shown and described.

JOHN MAYS.

Witnesses:
WM. E. PUGH,
R. WALLACE.